United States Patent
Ashida

(10) Patent No.: US 6,833,864 B1
(45) Date of Patent: Dec. 21, 2004

(54) IMAGE CAPTURING APPARATUS AND METHOD FOR OBTAINING IMAGES WITH BROAD BRIGHTNESS RANGE

(75) Inventor: Tetsuro Ashida, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/349,943

(22) Filed: Jul. 8, 1999

(30) Foreign Application Priority Data

Jul. 9, 1998 (JP) .......................................... 10-194106

(51) Int. Cl.$^7$ ............................................. H04N 5/235
(52) U.S. Cl. .............................. 348/229.1; 348/207.99; 348/362
(58) Field of Search ........................ 348/229.1, 207.99, 348/362

(56) References Cited

U.S. PATENT DOCUMENTS

| | | | | |
|---|---|---|---|---|
| 5,264,944 A | * | 11/1993 | Takemura | 386/38 |
| 5,596,366 A | * | 1/1997 | Takashima et al. | 348/208.16 |
| 5,598,237 A | * | 1/1997 | McIntyre et al. | 396/264 |
| 5,659,807 A | * | 8/1997 | Nakamura et al. | 396/55 |
| 5,864,722 A | * | 1/1999 | Aoki et al. | 396/263 |
| 6,295,088 B1 | * | 9/2001 | Tsukahara et al. | 348/333.06 |
| 6,332,060 B1 | * | 12/2001 | Miyamoto et al. | 396/55 |
| 6,429,895 B1 | * | 8/2002 | Onuki | 348/208.99 |
| 6,545,701 B2 | * | 4/2003 | Sinclair et al. | 348/36 |

FOREIGN PATENT DOCUMENTS

| | | | | |
|---|---|---|---|---|
| JP | 08-328195 | * | 12/1993 | H04N/5/232 |
| JP | 8214211 A | | 8/1996 | |
| JP | 09-080532 | * | 3/1997 | G03B/5/00 |
| JP | 9275527 A | | 10/1997 | |

* cited by examiner

Primary Examiner—Andrew Christensen
Assistant Examiner—Heather R. Long
(74) Attorney, Agent, or Firm—Birch, Stewart, Kolasch & Birch, LLP.

(57) ABSTRACT

An image capturing apparatus determines whether, if images are sequentially captured at a predetermined time interval, a main subject will hardly move in the images. The determination is made based on the detection by a tripod detection switch, which detects whether the image capturing apparatus is mounted on a tripod or not, etc. Only when it is determined that the main subject will be at the same position in the images, an imaging device including a solid state image sensor captures images multiple times at the predetermined time interval while an exposure control part changes exposures for the plurality of images, respectively. Then, the plurality of images with different exposures are combined into one image. Consequently, it is possible to combine the captured images, in which the main subject is at the same position, to obtain a desirable image with a broad dynamic range.

9 Claims, 2 Drawing Sheets

F I G. 2
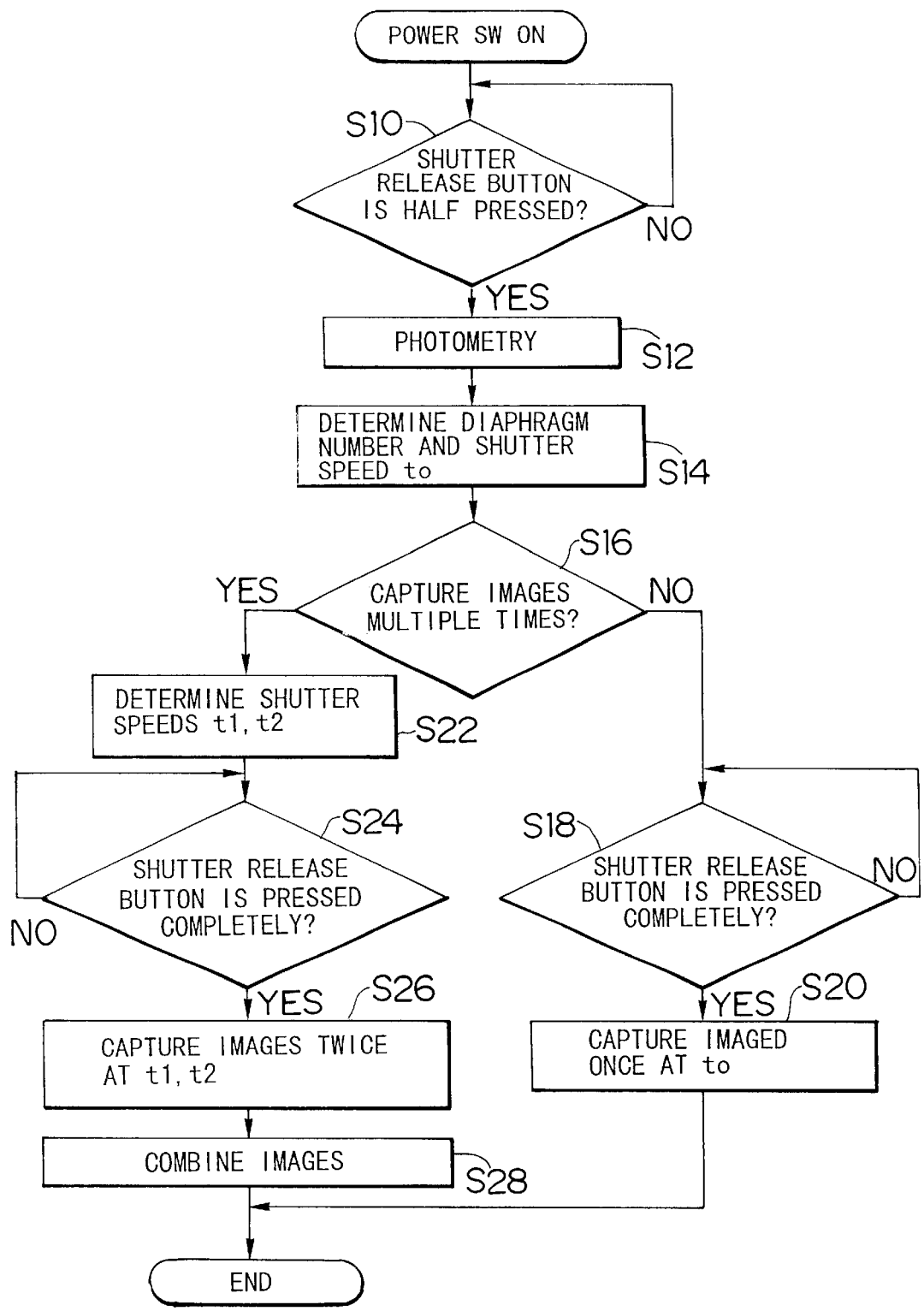

IMAGE CAPTURING APPARATUS AND METHOD FOR OBTAINING IMAGES WITH BROAD BRIGHTNESS RANGE

BACKGROUND OF THE INVENTION

1. Field of the Invention

The present invention relates generally to an image capturing apparatus and method, and more particularly to an image capturing apparatus such as a digital camera and method thereof that are able to obtain a preferable image of a subject with a broad brightness range.

2. Description of Related Art

An image capturing apparatus such as a digital camera uses a solid state image sensor such as a charge-coupled device (CCD), of which dynamic range is narrower than that of a silver halide film. Then, if an image of a subject with a broad brightness range is captured by the CCD, the image is partially blackened or whitened.

To enlarge the dynamic range of the digital camera, there has been proposed an apparatus that captures a plurality of images with different exposures in the same scene and combines the plurality of images to compose one image of a broad brightness range (Japanese Patent Provisional Publication Nos. 8-214211 and 9-275527).

The apparatus of Japanese Patent Provisional Publication No. 8-214211 automatically determines whether the dynamic range must be enlarged in accordance with the first captured image. Only when the apparatus determines that the dynamic range must be enlarged, another image is captured with a different exposure. If the apparatus determines that there is no need for enlarging the dynamic range, the image is captured only once so that the image can be captured within a short period. This apparatus captures the images twice whenever it determines that the dynamic range must be enlarged. Thus, a main subject in the second captured image may be out of the position of the main subject in the first image due to the movement of the main subject or the movement of the camera between the two image capturing operations. This deteriorates the quality of the composed image.

The apparatus of Japanese Patent Provisional Publication No. 9-275527 has a plurality of CCDs. The CCDs capture a plurality of images in different exposures, respectively, at the same time, and the captured images are combined. This apparatus, however, is relatively expensive and large because it must have the plurality of CCDs.

SUMMARY OF THE INVENTION

In view of the foregoing, it is an object of the present invention to provide an image capturing apparatus, which can combine a plurality of images in which a main subject is at almost the same position even if the plurality of images are not captured at the same time, and which can obtain a preferable image with a broad dynamic range.

To achieve the above-mentioned object, the present invention is directed to an image capturing apparatus, comprising: an imaging device for obtaining image data representing a subject; an exposure controller for controlling an exposure in the imaging device in accordance with brightness of the subject; a determination part for determining whether, if a plurality of images are sequentially captured at a predetermined time interval, the subject will be at the same position in the plurality of images; and a controlling part for controlling the imaging device to sequentially capture the plurality of images at the predetermined time interval while controlling the exposure controller to change exposures for the plurality of images, respectively, when the determination part determines that the subject will be at the same position in the plurality of images.

Preferably, the image capturing apparatus according to the present invention further comprises an image composition part for receiving image data with different exposures, obtained by the imaging device, and combining the image data to compose image data representing one image.

According to the present invention, the image capturing apparatus of the present invention captures the images multiple times while changing the exposure to enlarge the dynamic range only when it is determined that the main subject hardly moves and that the main subject will be at the same position in the images. It is therefore possible to satisfactorily combine the captured images to obtain an image with a broad dynamic range.

Preferably, the determination part comprises at least one of the following detection parts: a detection part for detecting that the image capturing apparatus is mounted on a tripod; a detection part for detecting a selection of a self-timer mode; a detection part for detecting a selection of a remote control mode; a detection part for detecting a selection of a macro image capturing mode; a detection part for detecting a selection of a distant view image capturing mode; a detection part for detecting that a shutter speed is lower than a predetermined threshold; and a detection part for detecting a selection of a multiple-time image capturing mode for capturing the plurality of images. The image capturing apparatus may further comprise: a body; and an imaging head including the imaging device, the imaging head being attached on the body and capable of rotating with respect to the body. In this case, the determination part may comprise a detection part for detecting that the imaging head is rotated by at least a predetermined angle with respect to the body and that the imaging device is ready to capture an image of a user.

Upon the detection by the detection part, it is determined that the image capturing apparatus is fixed or placed steadily and is unmoved, or that the main subject hardly moves.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a flow chart showing the operation of the image capturing apparatus according to the present invention.

DETAILED DESCRIPTION OF THE PREFERRED EMBODIMENT

Figure 1:
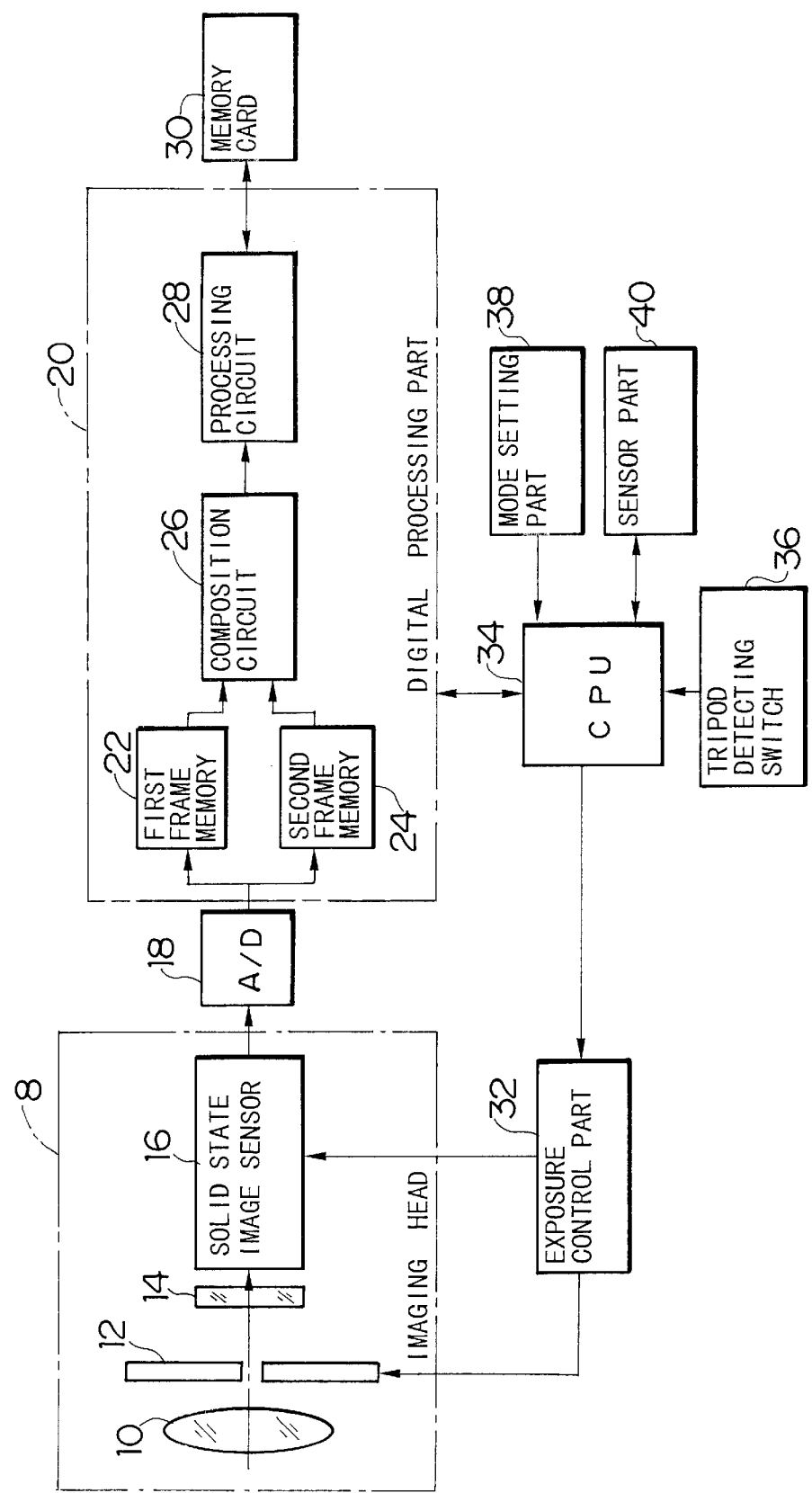
FIG. 1 is a block diagram showing a preferred embodiment of an image capturing apparatus according to the present invention.

This invention will be described in further detail by way of example with reference to the accompanying drawings.

FIG. 1 is a block diagram showing a preferred embodiment of an image capturing apparatus according to the present invention.

The image capturing apparatus in FIG. 1 is a digital camera for recording a still image into a storage medium or a memory card 30 by operating a shutter release button (not shown). The image capturing apparatus comprises: an imaging head 8 including a taking lens 10, a diaphragm 12, an optical low-pass filter 14 and a solid state image sensor 16; a digital processing part 20; an exposure control part 32; a central processing unit (CPU) 34; and a tripod detecting switch 36.

The imaging head 8 is rotatably attached to the body of the image capturing apparatus. Image light, which represents a subject, is formed on a light-receiving surface of a solid state image sensor 16 via the taking lens 10, the diaphragm 12 and the optical low-pass filter 14. The solid state image sensor 16 converts the image light, which is formed on the light-receiving surface, into charges and accumulates the charges as corresponding signal electric charges. Voltage signals (image signals) corresponding to the accumulated signal electric charges are read from the solid state image sensor 16. The diaphragm 12 includes, for example, a turret diaphragm provided with a plurality of holes with different apertures. The diaphragm 12 is controlled through the exposure control part 32 so that one of the holes with an appropriate aperture can be positioned on the optical axis of the taking lens 10.

A shutter drain is provided in the solid state image sensor 16 through a shutter gate. The shutter gate is driven by shutter gate pulses from the exposure control part 32, so that the accumulated signal electric charges can be discharged into the shutter drain. More specifically, the solid state image sensor 16 has a so-called electronic shutter function, which controls the time (a shutter speed) in which the electric charges are accumulated in each sensor by means of the shutter gate pulses. Image signals, which are read from the solid state image sensor 16, are converted into RGB digital signals by an A/D converter 18. Then, the RGB digital signals are sent to the digital processing part 20.

The digital processing part 20 comprises a first frame memory 22, a second frame memory 24, a composition circuit 26 and a processing circuit 28. The composition circuit 26 enlarges a dynamic range of a composed image in accordance with the image data, which are stored in the first frame memory 22 and the second frame memory 24. The processing circuit 28 converts the RGB digital signals into luminance signals Y and chroma signals C (YC signals), compresses the YC signals, expands the compressed data into YC signals, records and regenerates data in the memory card 30, and so on. The digital processing part 20 includes a photometry circuit, which integrates the luminance signals Y in one image to obtain an integrated value (a photometry value). The digital processing part 20 outputs the photometry value to the CPU 34.

The CPU 34 supervises the circuits in the image capturing apparatus, and sets a diaphragm number of the diaphragm 12 and the electric charge accumulation time (the shutter speed) in the electronic shutter of the solid state image sensor 16 in accordance with the brightness of the subject, which is found by the photometry circuit. The CPU 34 controls the diaphragm 12 in accordance with the diaphragm number through the exposure control part 32, and controls the electric charge accumulation time in the solid state image sensor 16 through the exposure control part 32. In accordance with detection signals from the tripod detecting switch 36, a mode setting part 38, a sensor part 40, etc.; the CPU 34 determines whether to capture images multiple times in order to enlarge the dynamic range, and performs the processing for capturing the images multiple times as described later.

The mode setting part 38 is used to set a self-timer mode for capturing an image with a self-timer, a remote control mode for capturing an image with a remote control, a macro image capturing mode, a distant view image capturing mode, a multiple-time image capturing mode for invariably capturing images multiple times, or the like. The sensor part 40 reads lens identification information from a ROM provided on an interchangeable lens, and detects whether the imaging head 8 has been rotated by a predetermined angle or more with respect to the body of the image capturing apparatus. A liquid crystal display (not shown) is provided at the back of the image capturing apparatus. The CPU 34 determines that the image capturing apparatus is ready to capture the image of the user if the imaging head 8 has been rotated by the predetermined angle or more, in other words if the imaging head 8 faces the back side of the image capturing apparatus.

If the CPU 34 detects that the image capturing apparatus has been mounted on a tripod in accordance with a detection signal from the tripod detecting switch 36, the CPU 34 determines that the image capturing apparatus is fixed and unmoved and the main subject will not move during the image capturing operation (i.e., the main subject will be at the same position in captured images). In this case, the CPU 34 executes the processing for capturing the images multiple times.

If the CPU 34 detects the selection of the self-timer mode or the remote control mode in accordance with a setting signal from the mode setting part 38, the CPU 34 determines that the image capturing apparatus is fixed or placed and unmoved and the main subject will not move during the image capturing operation (i.e., the main subject will be at the same position in captured images). In this case, the CPU 34 also executes the processing for capturing the images multiple times.

If the CPU 34 detects the selection of the macro image capturing mode or the distant view image capturing mode in which the subject distance is set at infinity in accordance with a setting signal from the mode setting part 38, or if the CPU 34 detects the attachment of a wide lens for capturing a close-up image or that the imaging head 8 has been rotated by the predetermined angle or more in accordance with the detection signals from the sensor part 40; the CPU 34 determines that the subject will hardly move during the image capturing operation (i.e., the main subject will be at the same position in captured images). In this case, the CPU 34 also executes the processing for capturing the images multiple times.

If the shutter speed is lower than a predetermined threshold, the CPU 34 determines that the exposure time is long and it is very likely that the subject remains stationary during the image capturing operation. In this case, the CPU 34 also executes the processing for capturing the images multiple times.

If the user selects the multiple-time image capturing mode, the CPU 34 also executes the processing for capturing the images multiple times.

A description will now be given of the operation of the image capturing apparatus according to the present invention with reference to a flow chart of FIG. 2.

If the shutter release button is half pressed after a power switch is turned on (S10), the CPU 34 finds the brightness of the subject by the photometry circuit (not shown) of the digital processing part 20 (S12). In accordance with the obtained photometry value, the CPU 34 sets the aperture number of the diaphragm 12 and the shutter speed $t_0$ in the electronic shutter of the solid state image sensor 16 so as to achieve the standard exposure (S14). An external photometry device may also determine the brightness of the subject.

Then, the CPU 34 determines whether to capture the images multiple times to enlarge the dynamic range in accordance with the detection signals from the tripod detecting switch 36, the mode setting part 38 and the sensor part 40 (S16).

If the CPU 34 determines not to capture the images multiple times, then it determines whether the shutter release button has been pressed completely (S18). If the shutter release button has been pressed completely, the CPU 34 controls the diaphragm 12 through the exposure control part 32 in accordance with the diaphragm number set at S14. The CPU 34 also controls the electric charge accumulation time in the solid state image sensor 16 through the exposure control part 32 in accordance with the shutter speed to in order to capture the image once in a standard manner (S20).

The captured image data of one frame is temporarily stored in the first frame memory 22 in FIG. 1 and is sent to the processing circuit 28 through the composition circuit 26. The processing circuit 28 performs the YC conversion, the compression, and so on for the image data. The compressed image data is recorded in the memory card 30. The image data is not processed in the composition circuit 26.

On the other hand, if the CPU 34 determines to capture the images multiple times at S16, the CPU 34 sets shutter speeds $t_1$, $t_2$ which are different from the shutter speed $t_0$ set at S14 (S22). The shutter speeds $t_1$, $t_2$ are set for an overexposure and an underexposure, respectively, with respect to the standard exposure set at S14.

Then, the CPU 34 determines whether the shutter release button has been pressed completely (S24). If the shutter release button has been pressed completely, the CPU 34 controls the diaphragm 12 through the exposure control part 32 in accordance with the diaphragm number set at S14. The CPU 34 also controls the electric charge accumulation time in the solid state image sensor 16 through the exposure control part 32 in accordance with the shutter speed $t_1$ set at S22 in order to capture the first image. Then, the CPU 34 controls the electric charge accumulation time in the solid state image sensor 16 through the exposure control part 32 with the diaphragm number being unchanged in accordance with the shutter speed $t_2$ set at S22 in order to capture the second image (S26). The time interval between the first capturing operation and the second capturing operation is preferably short; e.g., 1/60 second or 1/30 second.

The obtained image data of two frames are combined in such a way as to compose an image with the enlarged dynamic range (S28). More specifically, the image data of two frames are temporarily stored in the first frame memory 22 and the second frame memory 24 in FIG. 1, respectively, and they are sent to the composition circuit 26. The composition circuit 26 finds the saturated (whitened) area from the overexposed image data stored in the first frame memory 22, and replaces the image data of the saturated area with the image data in a corresponding area of the underexposed image data stored in the second frame memory 24. Alternatively, the composition circuit 26 may find the blackened area from the underexposed image data stored in the second frame memory 24, and replaces the image data of the blackened area with the image data in a corresponding area of the overexposed image data stored in the first frame memory 22.

The image data composed by the composition circuit 26 is sent to the processing circuit 28. The processing circuit 28 performs the YC conversion, the compression, and so on for the image data. The compressed image data is recorded in the memory card 30. Color signals such as RGB signals are used to compose the image. It is also possible to use only luminance signals to compose the image and then add color information. Of course, the image may be composed in variety of ways to enlarge the dynamic range.

In this embodiment, the CPU 34 sets the shutter speeds $t_1$, $t_2$ for an overexposure and an underexposure, respectively, with respect to the standard exposure (the shutter speed $t_0$) set at S14. If, however, the CPU 34 only detects either one of the blackened area and the whitened area from a histogram of the image data after the image is captured with the normal exposure set at S14; it is possible to set the shutter speed $t_1$ as being equal to the shutter speed to and set the shutter speed $t_2$ for appropriate one of an overexposure or and underexposure.

In this embodiment, the images are captured twice in the processing for capturing the images multiple times, but it is also possible to capture the images three times or more. For example, the images are captured three times with the normal exposure, the overexposure and the underexposure. The composed image data is recorded in the memory card 30 in this embodiment, but it is also possible to record the original image data before the composition as well as the composed image data.

As set forth hereinabove, the image capturing apparatus of the present invention captures the images multiple times while changing the exposure to enlarge the dynamic range only when the CPU 34 determines that the main subject hardly moves and that, if the images are captured multiple times, the main subject will be at the same position in the images. This makes it possible to satisfactorily combine a plurality of captured images to obtain the preferable image with the broad dynamic range.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image capturing apparatus, comprising:
    an imaging device for obtaining image data representing a subject;
    an exposure controller for controlling an exposure in the imaging device in accordance with brightness of the subject;
    a determination part for determining whether, if a plurality of images are sequentially captured at a predetermined time interval, the subject will be at a same position in the plurality of images;
    a controlling part for controlling the imaging device to sequentially capture the plurality of images at the predetermined time interval while controlling the exposure controller to change exposures for the plurality of images, respectively, when the determination part determines that the subject will be at the same position in the plurality of images; and
    an image composition part for receiving image data with different exposures, obtained by the imaging device, and combining the image data to compose image data representing one image.

2. An image capturing apparatus, comprising:
    an imaging device for obtaining image data representing a subject;
    an exposure controller for controlling an exposure in the imaging device in accordance with brightness of the subject;

a determination part for determining whether, if a plurality of images are sequentially captured at a predetermined time interval, the subject will be at a same position in the plurality of images; and a controlling part for controlling the imaging device to sequentially capture the plurality of images at the predetermined time interval while controlling the exposure controller to change exposures for the plurality of images, respectively, when the determination part determines that the subject will be at the same position in the plurality of images;

wherein the determination part comprises a detection part for detecting that the image capturing apparatus is mounted on a tripod and wherein the determination part determines that the subject will be at the same position in the plurality of images if the detection part detects that the image capturing apparatus is mounted on the tripod.

3. An image capturing apparatus, comprising:

an imaging device for obtaining image data representing a subject;

an exposure controller for controlling an exposure in the imaging device in accordance with brightness of the subject;

a determination part for determining whether, if a plurality of images are sequentially captured at a predetermined time interval, the subject will be at a same position in the plurality of images; and a controlling part for controlling the imaging device to sequentially capture the plurality of images at the predetermined time interval while controlling the exposure controller to change exposures for the plurality of images, respectively, when the determination part determines that the subject will be at the same position in the plurality of images;

wherein the determination part comprises a detection part for detecting a selection of a self-timer mode and wherein the determination part determines that the subject will be at the same position in the plurality of images if the detection part detects the selection of the self-timer mode.

4. An image capturing apparatus, comprising:

an imaging device for obtaining image data representing a subject;

an exposure controller for controlling an exposure in the imaging device in accordance with brightness of the subject;

a determination part for determining whether, if a plurality of images are sequentially captured at a predetermined time interval, the subject will be at a same position in the plurality of images; and a controlling part for controlling the imaging device to sequentially capture the plurality of images at the predetermined time interval while controlling the exposure controller to change exposures for the plurality of images, respectively, when the determination part determines that the subject will be at the same position in the plurality of images;

wherein the determination part comprises a detection part for detecting a selection of a remote control mode and wherein the determination part determines that the subject will be at the same position in the plurality of images if the detection part detects the selection of the remote control mode.

5. An image capturing apparatus, comprising:

an imaging device for obtaining image data representing a subject;

an exposure controller for controlling an exposure in the imaging device in accordance with brightness of the subject;

a determination part for determining whether, if a plurality of images are sequentially captured at a predetermined time interval, the subject will be at a same position in the plurality of images; and a controlling part for controlling the imaging device to sequentially capture the plurality of images at the predetermined time interval while controlling the exposure controller to change exposures for the plurality of images, respectively, when the determination part determines that the subject will be at the same position in the plurality of images;

wherein the determination part comprises a detection part for detecting a selection of a macro image capturing mode and wherein the determination part determines that the subject will be at the same position in the plurality of images if the detection part detects the selection of the macro image capturing mode.

6. An image capturing apparatus, comprising:

an imaging device for obtaining image data representing a subject;

an exposure controller for controlling an exposure in the imaging device in accordance with brightness of the subject;

a determination part for determining whether, if a plurality of images are sequentially captured at a predetermined time interval, the subject will be at a same position in the plurality of images; and a controlling part for controlling the imaging device to sequentially capture the plurality of images at the predetermined time interval while controlling the exposure controller to change exposures for the plurality of images, respectively, when the determination part determines that the subject will be at the same position in the plurality of images;

wherein the determination part comprises a detection part for detecting a selection of a distant view image capturing mode and wherein the determination part determines that the subject will be at the same position in the plurality of images if the detection part detects the selection of the distant view image capturing mode.

7. An image capturing apparatus, comprising:

an imaging device for obtaining image data representing a subject;

an exposure controller for controlling an exposure in the imaging device in accordance with brightness of the subject;

a determination part for determining whether, if a plurality of images are sequentially captured at a predetermined time interval, the subject will be at a same position in the plurality of images; and a controlling part for controlling the imaging device to sequentially capture the plurality of images at the predetermined time interval while controlling the exposure controller to change exposures for the plurality of images, respectively, when the determination part determines that the subject will be at the same position in the plurality of images;

wherein the determination part comprises a detection part for detecting that a shutter speed is lower than a predetermined threshold and wherein the determination part determines that the subject will be at the same position in the plurality of images if the detection part detects that the shutter speed is lower than the predetermined threshold.

8. An image capturing apparatus, comprising:

an imaging device for obtaining image data representing a subject;

an exposure controller for controlling an exposure in the imaging device in accordance with brightness of the subject;

a determination part for determining whether, if a plurality of images are sequentially captured at a predetermined time interval, the subject will be at a same position in the plurality of images; and a controlling part for controlling the imaging device to sequentially capture the plurality of images at the predetermined time interval while controlling the exposure controller to change exposures for the plurality of images, respectively, when the determination part determines that the subject will be at the same position in the plurality of images;

wherein the determination part comprises a detection part for detecting a selection of a multiple-time image capturing mode for capturing the plurality of images and wherein the determination part determines that the subject will be at the same position in the plurality of images if the detection part detects the selection of the multiple-time image capturing mode.

9. An image capturing apparatus, comprising:

an imaging device for obtaining image data representing a subject;

an exposure controller for controlling an exposure in the imaging device in accordance with brightness of the subject;

a determination part for determining whether, if a plurality of images are sequentially captured at a predetermined time interval, the subject will be at a same position in the plurality of images;

a controlling part for controlling the imaging device to sequentially capture the plurality of images at the predetermined time interval while controlling the exposure controller to change exposures for the plurality of images, respectively, when the determination part determines that the subject will be at the same position in the plurality of images;

a body; and an imaging head including the imaging device, the imaging head being attached on the body and capable of rotating with respect to the body, wherein the determination part comprises a detection part for detecting that the imaging head is rotated by at least a predetermined angle with respect to the body and that the imaging device is ready to capture an image of a user, and wherein the determination part determines that the subject will be at the same position in the plurality of images if the detection part detects that the imaging head is rotated by at least the predetermined angle with respect to the body and that the imaging device is ready to capture the image of the user.

* * * * *